United States Patent [19]
Culbertson et al.

[11] Patent Number: 5,096,784
[45] Date of Patent: Mar. 17, 1992

[54] POLYESTER FILM WITH NODULE SURFACE

[75] Inventors: Edwin C. Culbertson; John M. Heberger, both of Greer, S.C.

[73] Assignee: Hoechst Celanese Corporation, Somerville, N.J.

[21] Appl. No.: 453,728

[22] Filed: Dec. 20, 1989

[51] Int. Cl.$^5$ .............................................. B32B 27/06
[52] U.S. Cl. .................................. 428/482; 428/332; 428/409; 428/480; 428/483; 524/365
[58] Field of Search ............... 428/480, 483, 332, 409, 428/482; 524/365

[56] References Cited

U.S. PATENT DOCUMENTS

| | | |
|---|---|---|
| 3,819,773 | 6/1974 | Pears . |
| 4,067,855 | 1/1978 | Miwa et al. . |
| 4,138,386 | 2/1979 | Motegi et al. . |
| 4,214,035 | 7/1980 | Heberger . |
| 4,233,352 | 11/1980 | Ono et al. . |
| 4,328,283 | 5/1982 | Nakadate et al. ............... 428/483 |
| 4,371,489 | 2/1983 | McGrail . |
| 4,461,797 | 7/1984 | Adachi et al. . |
| 4,548,855 | 10/1985 | Ono et al. . |
| 4,571,363 | 2/1986 | Culbertson et al. ............... 428/483 |
| 4,588,776 | 5/1986 | Bekker et al. ...................... 525/81 |
| 4,642,263 | 2/1987 | Culbertson ........................ 428/336 |
| 4,670,505 | 7/1987 | Craig ................................ 524/704 |

FOREIGN PATENT DOCUMENTS 1125460 8/1968 United Kingdom .

*Primary Examiner*—Merrell C. Cashion, Jr.
*Assistant Examiner*—Hoa T. Le
*Attorney, Agent, or Firm*—Gregory N. Clements

[57] ABSTRACT

A polyester film having a nodule surface is disclosed. The acrylic coating is preferably a crosslinked composition having a relatively high methyl methacrylate content and specific surfactants. The acrylic coating composition is applied as an aqueous dispersion to polyester film, preferably after corona treatment of the polyester film. The nodule surface reduces the coefficient of friction of the polyester film. The coating composition comprises from 60 to 90 mole percent methyl methacrylate; from 10 to 35 mole percent of at least one modifier selected from the group of ethyl acrylate, propyl acrylate, butyl acrylate, and mixtures of these; and from 3 to 10 mole percent of a crosslinkable monomer or a self-crosslinking monomer selected from the group of N-methylol methacrylamide, N-methylol acrylamide, acrylamide, methacrylamide, and mixtures of these; with from 2 to 15 weight percent of the nonionic surfactant and at least 0.1 percent by weight of the anionic surfactant.

8 Claims, 1 Drawing Sheet

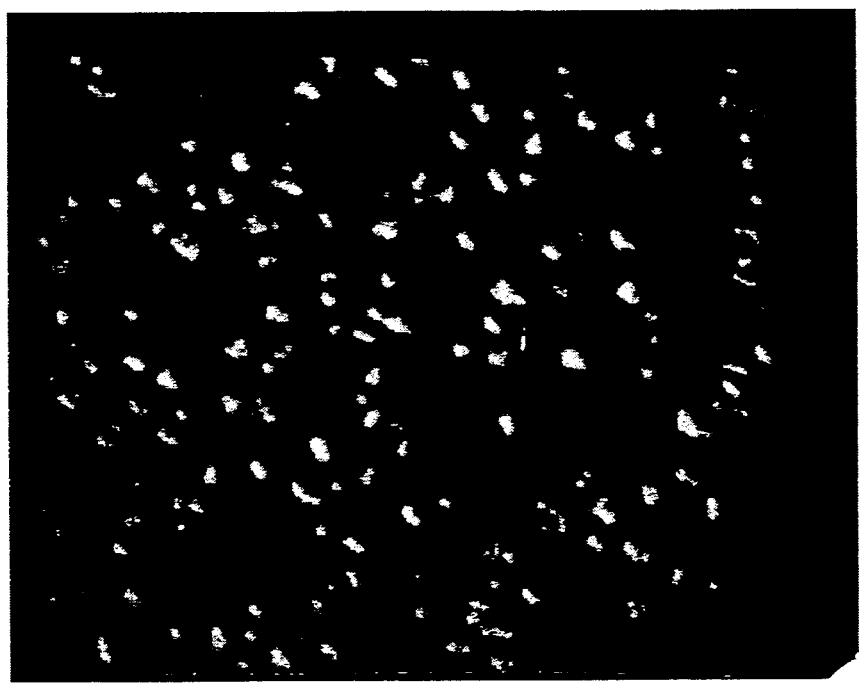

POLYESTER FILM WITH NODULE SURFACE

BACKGROUND OF THE INVENTION

1) Field of the Invention

The present invention relates to a coated polyester film having utility as a substrate for magnetic tape applications such as video tape. More particularly, the present invention relates to a polyester film having an acrylic coating having a relatively high methyl methacrylate content on at least one major surface of said film. It has been found that relatively high methyl methacrylate content terpolymers, in combination with specific surfactants and using relatively low anionic surfactant concentrations, impart a "nodule" surface to polyester film substrates which reduced the coefficient of friction of such films.

2) Prior Art

Oriented polyester films possess generally good mechanical properties resulting in wide commercial acceptance as substrates for magnetic tape applications. The polyester film substrate may be coated on at least one side with an adhesion-promoting primer coating, which is itself overcoated with a magnetizable coating.

Acrylic terpolymers conforming to the terpolymers of the present invention have previously been incorporated in aqueous coating dispersions for polyester films. U.S. Pat. No. 4,371,489 to P. McGrail, titled "Production Of Anti-Static Thermoplastic Films" broadly discloses a methyl methacrylate/ethyl acrylate/methacrylamide terpolymer having molar range percentages of 40 to 80 percent methyl methacrylate; 15 to 50 mole percent ethyl acrylate; and 2 to 25 mole percent crosslinkable comonomer. The preferred methyl methacrylate molar range is taught to be 45 to 50 percent. The McGrail patent teaches the use of this terpolymer in combination with an alkyl or aryl phosphate ester which is present as free acid or as a partial or complete sodium or potassium salt to form a coating composition for polyester films. The McGrail patent does not disclose nor suggest the creation of a nodule surface as a method of reducing the high coefficient of friction of polyester film.

Similarly, "Polyester Film Primed With Crosslinked Acrylic Polymers", Japanese Patent Application No. 259422/1984 (Published Aug. 6, 1985), discloses a methyl methacrylate/ethyl acrylate/N-methylol acrylamide terpolymer wherein the methyl methacrylate preferably comprises 35 to 85 mole percent of the terpolymer. The application broadly suggests the use of a surfactant, but does not disclose specific surfactants for use with the acrylic terpolymer.

Other patents also disclose crosslinkable acrylic terpolymers as having utility as coatings for polyester films, typically to reduce static charge build-up on the film as it travels over record/playback heads, rollers, guidepins, and other components of electronic equipment. Generally, however, these patents teach the use of relatively lower amounts of methyl methacrylate. For example, U.S. Pat. No. 4,214,035 (July 22, 1980) to J. Heberger, titled "Antistatic Coated Polyester Films", (commonly assigned) broadly discloses a methyl methacrylate/ethyl acrylate/methacrylamide terpolymer having a glass transition temperature in the range of from 40° to 50° C., preferably 45° C. While the patent is silent as to any mole percentages of the components of the terpolymer, it is believed that the methyl methacrylate molar percentage of this terpolymer does not exceed 50 mole percent.

Similarly, U.S. Pat. No. 3,819,773 (June 25, 1974) to G. Pears, titled "Method For Preparing Reclaimable Coated Polyester Films", discloses a crosslinkable acrylic terpolymer comprising 50 percent by weight methyl methacrylate.

British Patent Specification No. 1,125,460, "Improvements Relating To Polyester Film Base" (Published August 28, 1968), discloses a high (70 to 95 percent by weight) methyl acrylate (as opposed to methyl methacrylate) terpolymer, but it comprises itaconic acid (2 to 20 percent) and either diallyl phthlate or divinylbenzene (3 to 30 percent) as the other comonomers rather than the comonomers of the present invention. The patent is directed to rendering polyethylene terephthalate film less hydrophobic, and does not disclose nor suggest the creation of a "nodule" surface as a method of reducing the high coefficient of friction of polyester film.

"A Process For Preparing Subbing Coated Polyester Film", British Patent Specification No. 1,168,171 (Published Oct. 22, 1969), discloses high (70 to 90 percent by weight) content methyl methacrylate terpolymers which must have 3 to 30 percent of itaconic acid, and 7 to 20 percent of an aliphatic poly-functional compound containing at least two sites of carbon to carbon unsaturation, where at least one of the sites is represented by an allylic or vinylic group, glycidyl acrylate, glycidyl methacrylate esters wherein the alcohol portion of the ester is hydroxy substituted, or fumaric acid.

U.S. Pat. No. 4,571,363 to Culbertson et al (commonly assigned) teaches a polyester film primed with an acrylic, crosslinked terpolymer for a primer coating. The primer coating comprises at least about 50 percent by weight of acrylic and/or methacrylic monomers; from about 1 percent to about 15 percent by weight of a comonomer capable of inter-molecular crosslinking upon the application of heat, and from 0 to about 49 percent by weight of one or more halogen-free monoethylenically unsaturated monomers copolymerizable therewith. While this patent states that it is desirable to include a surfactant for wettability, no specific surfactant types and amounts are disclosed or required.

One problem associated with polyester film is the high coefficient of friction of uncoated and unmodified oriented polyester film. Such film typically is very smooth, and tends to "block" or stick to other layers of such film when wound upon itself.

Prior artisans have devised two methods for reducing the high coefficient of friction of oriented polyester film, both of which involve roughening the smooth surface of the polyester film in order to reduce its high coefficient of friction. The polyester film surface must not be excessively roughened, or its utility as a substrate for magnetic tape applications will be destroyed. One well known method involves coating the film with a crosslinkable coating which contains particles and then crosslinking the coating composition, thereby binding the particles. The function of the particles is to reduce the coefficient of friction by creating a more roughened surface than the uncoated polyester film.

Coating the polyester film surface with a particle-containing coating composition to reduce the film's coefficient of friction is not a panacea. Problems which are associated with this method include wide particle size distribution and agglomeration of the particles, both of which tend to degrade the film's utility as a magnetic tape substrate.

Another method for reducing the inherently high coefficient of friction of polyester film involves the creation of "internal" particles during the polyester synthesis by controlled precipitation of the catalyst residue and reaction thereof with polyester monomers or oligomers. Such particles are substantially homogeneously distributed throughout the polyester resin, and only a small amount are present at or near the surface of the polyester film where coefficient of friction is measured. Such internally generated particles are described more fully in U.S. Pat. Nos. 4,138,386 and 4,067,855. This method requires extremely close control over the polyester synthesis and can create processing difficulties during the manufacture of polyester film from such resin.

U.S. Pat. No. 4,138,386 (Feb. 6, 1979) to M. Motegi et al, titled "Polyester Film For Magnetic Tape", discloses the use of internally-generated polyester particles in combination with inert particles selected from the group consisting of oxides or salts of elements of Groups II, III, or IV of the periodic table.

U.S. Pat. No. 4,461,797 (July 24, 1984) to T. Adachi et al, titled "Polyester Film With Projections And Depressions On The Surface", discloses the addition of organic or inorganic particles to a polyester resin prior to manufacture into a polyester film. By preheating the extruded polyester film prior to orientation, void formation around the particles is substantially eliminated. The surface of the Adachi et al '797 biaxially oriented polyester film is characterized by elliptical depressions having a projection in the middle of the depression. This surface exhibits a reduced coefficient of friction in comparison to polyester film which was not preheated prior to orientation.

U.S. Pat. No. 4,233,352 (Nov. 11, 1980) to M. Ono et al, titled "Polyester Film And Method Of Manufacture Thereof", discloses a polyester film having a discontinuous layer of a water soluble polymer on at least one major surface. The discontinuous polymeric layer comprises discrete "worm-like" patterns comprising a mixture of a water soluble polymer, polysiloxane and/or styrene-butadiene polymer, and optionally natural wax. The water soluble polymer may be any water soluble polymer having a molecular weight between 10,000 and 2,000,000. Suitable water soluble polymers include methyl cellulose, hydroxyethyl cellulose, carboxymethyl cellulose, polyvinyl alcohol, gum tragacanth, gum arabic, casein, and gelatin.

U.S. Pat. No. 4,548,855 (Oct. 22, 1985) to M. Ono et al, titled "Polyester Film For Magnetic Recording Medium", is an improvement over the film disclosed in Ono et al '352. Ono et al '855 discloses a polyester film having a discontinuous layer of a water soluble polymer on at least one major surface. The discontinuous layer should not exceed 500 angstroms in thickness, and is preferably from 50 to 300 angstroms thick. The water soluble polymer should have a molecular weight of from 10,000 to 2,000,000, and may be polyvinyl alcohol, tragacanth gum, gum arabic, casein, gelatin, methyl cellulose, hydroxyethyl cellulose, and carboxymethyl cellulose. Ono et al '855 further discloses fine particles which are present on the surface of the discontinuous layer and the exposed polyester film surface. The fine particles may be alkali metal salt derivatives of sulfonic acid which are mixed with the polyester resin or the particles may be "internally" generated by precipitation of the polyester catalyst. The particle size may range from 50 to 400 angstroms, and the shape of the particles is not critical.

SUMMARY OF THE INVENTION

The present invention relates to an acrylic terpolymer coating on a polyester film which produces a low coefficient-of-friction film useful in magnetic tape applications, or other areas where low coefficient-of-friction film is desirable. The acrylic terpolymer, along with specific surfactants, is in an aqueous emulsion and is applied to the film. The dried residue of the aqueous emulsion forms nodules on the coated surface of film. The acrylic terpolymer coating may be uncrosslinked or preferably crosslinked. In order to obtain the nodule surface coating, the amounts of the components are critical.

In one broad aspect, the present invention relates to an oriented polyester film having a nodule surface comprising:

an oriented polyester film having an acrylic coating on at least one surface, said acrylic coating being the dried residue of an aqueous emulsion, said acrylic coating comprising:
 (a) from 80 to 97.9 percent by weight, based upon the total weight of said composition, of a methyl methacrylate terpolymer comprising:
  (1) from 60 to 90 mole percent methyl methacrylate;
  (2) from 10 to 35 mole percent of an acrylate modifier selected from the group consisting of ethyl acrylate, propyl acrylate, butyl acrylate, or a mixture of these;
  (3) from 1 to 10 mole percent of at least one crosslinkable comonomer selected from the group consisting of N-methylol acrylamide, N-methylol methacrylamide, acrylamide, methacrylamide, or mixtures of these;
 (b) from 2 to 15 percent by weight, based upon the total weight of said coating composition, of a nonionic surfactant; and
 (c) at least from about 0.1 percent by weight, based upon the total weight of said coating composition, of an anionic surfactant;
wherein said acrylic coating forms a "nodule" surface characterized by nodule islands rising from the surface of said film with a minimum surface area coverage of about 5 percent.

In another aspect, the present invention relates to a process for the production of oriented polyester film having a nodule surface comprising:
(i) exposing at least one surface of polyester film to an electric corona discharge, thereby forming surface-treated, polyester film;
(ii) coating said surface-treated polyester film with an emulsion of water and an acrylic emulsion composition, said acrylic composition comprising:
 (a) from 80 to 97.9 percent by weight, based upon the total weight of said composition, of a methacrylic terpolymer comprising:
  (1) from 60 to 90 mole percent methyl methacrylate;
  (2) from 10 to 35 mole percent of an acrylate modifier selected from the group consisting of ethyl acrylate, propyl acrylate, butyl acrylate, or a mixture of these;
  (3) from 1 to 10 mole percent of at least one component selected from the group consisting of N-methylol acrylamide, N-methylol methacrylamide; acrylamide, and methacrylamide, or a mixture of these;
(b) from 2 to 15 percent by weight, based upon the total weight of said coating composition, of a nonionic surfactant;
(c) at least from about 0.1 percent by weight, based upon the total weight of said coating composition, of an anionic surfactant, thereby forming a coated polyester film;
(iii) drying said coating on said film to form said nodule surface;
wherein said nodule surface is characterized by nodule islands rising from the surface of said film with a minimum surface area coverage of about 5 percent.

BRIEF DESCRIPTION OF THE DRAWING

The photomicrograph shows a nodule surface of the preferred embodiment in which the acrylic terpolymer coating is applied at a 1 percent by weight solids level to the polyester film.

DESCRIPTION OF THE PREFERRED EMBODIMENTS OF THE INVENTION

I. Polyester Film Manufacture

The polyester film of the present invention can be manufactured from various thermoplastic polyester resins. Polyethylene terephthalate, polytetramethylene terephthalate, polyethylene, 2,6-napthalate and poly-1,4-cyclohexylene dimethyl terephthalate are examples of suitable polyester homopolymers which may be employed in the practice of the present invention. Polyester copolymers may also be used. Possible copolyesters include polyethylene terephthalate/ isophthalate, polyethylene terephthalate/adipate, polyethylene terephthalate/sebacate, and polyethylene terephthalate/ sulphoisophthalate. Polyethylene terephthalate homopolyester is preferred.

The polyester film of the present invention can be manufactured by an extrusion process. The polyester resin is first heated to a molten state and then extruded through a wide slot die in the form of an amorphous sheet. The sheet-like extrudate is rapidly cooled or "quenched" to form a cast sheet of polyester by contacting and travelling partially around a polished, revolving casting drum. The cast polyester sheet may then be axially stretched in one direction, either in the direction of film travel (machine direction) or perpendicular to the machine direction (transverse direction), while being heated to a temperature in the range of from 80° C. to 160° C., preferably 90° C. to 100° C. The degree of stretching may range from 3.0 to 5.0 times the original cast sheet unit dimension, preferably from about 3.2 to about 4.2 times the original cast sheet dimension. Preferably, the polyester film is biaxially oriented (stretched in both the machine direction and the transverse direction) rather than uniaxially oriented.

Prior to coating the polyester film surface with the methacrylate terpolymer coating composition, the film may be surface-treated in a conventional manner by exposure to an electric corona discharge. Electric corona discharge is a conventional surface treatment which is commonly performed on polyester films to enhance the film's surface qualities, especially its adhesive and printing properties. Electric corona discharge methods and apparatus are described in U.S. Pat. Nos. 3,057,792 and 4,239,973. For uniaxially oriented film, the corona treatment followed by the coating may occur during the in-line manufacturing process, either before stretch orientation or after. If the corona treatment followed by the coating occurs before stretch orientation, heating the film before stretch orientation will drive off the water. If the corona treatment and coating for uniaxially oriented film occur after the stretch orientation step during in-line manufacturing, it is necessary to completely dry the film before winding. For uniaxially oriented film, the preferred procedure is to corona treat and coat the film before stretch orientation.

For biaxially oriented film, the corona treatment followed by the terpolymer coating may occur during the in-line manufacturing process, either before stretch orientation, or between the machine draw and transverse draw of biaxial stretch orientation, or after stretch orientation. If the corona treatment and coating steps occur after stretch orientation, it is necessary to completely dry the film before winding. If the corona treatment and coating occur before orientation, or between draw during orientation, the later orientation steps which require the film to be heated would drive off the excess water from the terpolymer coating. Preferably, for biaxially oriented film the corona treatment and subsequent terpolymer coating occur between draws during the stretch orientation step.

The polyester sheet is coated on the electric corona discharge treated surface with an aqueous terpolymer dispersion of the acrylic coating composition described below. The coating composition may conveniently be applied as an aqueous dispersion or emulsion using any of the well known coating techniques. For example, the film may be coated by roller coating, spray coating, gravure coating or slot coating. The heat applied to the film during the subsequent preheating, stretching, and heat-setting stages is generally sufficient to evaporate the water and crosslink the acrylic coating, if a crosslinkable monomer comprised a portion of the acrylic coating.

The coated, oriented polyester film may then be heat treated for a period of time necessary to crystallize the film. Crystallization imparts dimensional stability and good tensile properties to the polyester film. Oriented polyethylene terephthalate film may be heat-set at a temperature ranging from 190° C. to 240° C., preferably from 215° C. to 235° C. The coated crystalline, oriented polyester film is then wound into a roll.

The above description describes an in-line (during manufacturing) coating process. While this is the preferred process for oriented polyester film, oriented polyester film could also be coated off-line (after manufacture of the film is complete) preferably after corona treatment. Off-line operations are typically conducted by a converter who purchases film from a manufacturer and further processes it for specific customers. While the coating of the present invention can be utilized for off-line operations, better nodule formation and lower coefficient of friction results are achieved when the present invention is employed in-line (during manufacturing of the film).

II. The Acrylic Coating Composition

The acrylic coating composition of the present invention comprises from 80 to 97.9 weight percent of a methyl methacrylic terpolymer which employs a relatively high amount (i.e., from 60 to 90 mole percent) of methyl methacrylate; from 10 to 35 mole percent of an acrylate modifier selected from the group consisting of ethyl acrylate, propyl acrylate, butyl acrylate, or a mixture of these; and from 1 to 10 mole percent of a comonomer selected from the group consisting of N-methylol acrylamide, N-methylol methacrylamide, acrylamide, methacrylamide, or a mixture of these. The coating composition also includes from 2 to 15 percent by weight, based upon the total weight of the coating composition, of a nonionic surfactant; and at least from about 0.1 percent by weight, based upon the total weight of the coating composition, of an anionic surfactant.

A. The Methyl Methacrylate Terpolymer

The higher the methyl methacrylate concentration, the more hardness the acrylic coating will display. Hardness contributes to incomplete latex film formation. For this reason conventional acrylic coatings generally do not employ methyl methacrylate in molar amounts greater than 60 mole percent. The methyl methacrylate terpolymer of the present invention employs from 60 to 90 mole percent, preferably from 75 to 85 mole percent, of methyl methacrylate.

The second component of the methyl methacrylate terpolymer is at least one modifier selected from the group consisting of ethyl acrylate, propyl acrylate, and butyl acrylate. The modifier permits adjustment of the hardness of the acrylic coating by varying the methyl methacrylate monomer molar concentration. From 10 to 35 mole percent, preferably from 10 to 20 mole percent, of the modifier is employed in the methyl methacrylate terpolymer. Ethyl acrylate is preferred.

The third component of the methyl methacrylate terpolymer is the comonomer, which may be N-methylol acrylamide, N-methylol methacrylamide, acrylamide and methacrylamide. N-methylol acrylamide and N-methylol methacrylamide are preferred due to their "self-crosslinking" ability to react with another N-methylol functional group. By contrast, acrylamide and methacrylamide alone are not crosslinkable. However, it is preferred that the terpolymer be crosslinked. To crosslink the terpolymer when acrylamide or methacrylamide are used requires a second functional group with which to react, such as may be provided by the inclusion of a melamine-formaldehyde or urea-formaldehyde resin. Other functional compounds which may be employed to crosslink with acrylamide or methacrylamide are aziridines, glycoluril-formaldehyde, benzo guanamines, acrylamide glycolic acid, bis-acrylamido glyoxal, diacrylamido acetic acid and the like. If acrylamide and/or methacrylamide are employed, the amount of a second reactional resin such as melamine-formaldehyde or urea-formaldehyde may be present from about 0.1 to about 5 weight percent based on the total weight of the coating composition, i.e., the terpolymer and the second reactional resin. From 1 to 10 mole percent, preferably from 3 to 7 mole percent, of the comonomer is employed in the methyl methacrylate terpolymer.

The three components discussed above—methyl methacrylate, a modifier, and a (preferred crosslinkable) comonomer—are emulsion polymerized to form a methyl methacrylate terpolymer latex which is diluted to form an aqueous dispersion suitable for coating the polyester substrate as described above.

B. The Nonionic Surfactant

The function of the nonionic surfactant is to prevent post-emulsion polymerization agglomeration of the methyl methacrylate terpolymer particles and resultant grit formation.

The nonionic surfactant may range from 2 to 15 percent by weight, based upon the total weight of the coating composition. Less than 2 percent by weight results in emulsion instability. More than about 10 percent by weight of the nonionic surfactant results in diminishing nodule formation. Nonionic surfactants which are operable in the present invention include alkylphenol ethoxylates which conform to the formula set forth below:

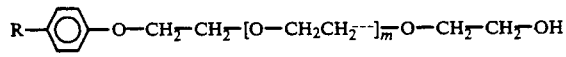

wherein R means alkyl, and m may range from 15 to 100.

Alkyphenol ethoxylates are well known surfactants which are commercially available from several suppliers, including Rohm and Haas Company in Philadelphia, Pennsylvania; Union Carbide Corporation in New York, N.Y.; and the Whitestone Chemical Department of BASF, in Spartanburg, S.C.

Octylphenol ethoxylates are a preferred class of nonionic surfactant for the present invention. Most preferred is octylphenol ethoxylate

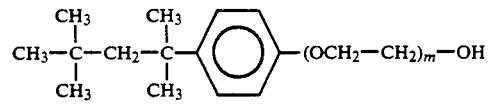

where the degree of polymerization (m) is nominally 40.

C. The Anionic Surfactant

The function of the anionic surfactant is to emulsify the acrylic comonomers during the polymerization reaction and to stabilize the reaction mixture generally. The anionic surfactant would preferably be employed at 0.1 or higher weight percent based upon the total weight of the coating composition to produce good micelle formation. Less than about 0.1 percent by weight of the anionic surfactant results in an unstable emulsion, more than about 0.5 percent by weight of the anionic surfactant does not significantly improve the coating. Anionic surfactants which may be operable in the present invention include sodium lauryl sulfate or sodium dodecylbenzene sulfonate, for example.

D. Emulsion Polymerization of the Methacrylic Terpolymer

Emulsion polymerization is a conventional polymer synthesis process carried out at atmospheric pressure and at a temperature of from about 40° C. to 60° C. In practice, an aqueous emulsion of the three comonomers and the surfactants is slowly metered into an aqueous solution containing a redox initiator system as well as additional quantities of the anionic and nonionic surfactants.

Typical initiators for emulsion polymerization reactions are peroxide compounds such as lauryl peroxide, benzoyl peroxide, methyl ethyl ketone peroxide, and the like.

As in all emulsion polymerization reactions, water quality is an important consideration. Deionized water should be used since the presence of certain multivalent ions in uncontrolled concentrations can interfere with both the initiation process and the action of the emulsifier.

As the comonomer emulsion is slowly metered into the water containing the surfactants and the initiator, copolymerization of the methyl methacrylate, modifier, and the comonomer begins, thereby forming the methyl methacrylate terpolymer particles.

Near the completion of the polymerization reaction, the reaction mixture will comprise small methyl methacrylate terpolymer particles suspended in water due to the nonionic and anionic surfactants. This latex may typically have a solids level of from 25 to 30 percent and thus it will be necessary to dilute it with water to achieve a more usable range for coating. Higher solids levels will result in agglomeration of the methyl methacrylic terpolymer particles into larger particles or clumps of particles which will tend to precipitate from the solution as grit. As discussed above, the nonionic surfactant serves as a post-polymerization emulsion stabilizer.

The above described emulsion polymerization process is well known and described in "Principles of Polymerization" by George Odian, second edition, published by John Wiley and Sons.

The coating of the present invention may be applied to the base film as an aqueous dispersion having a solids concentration within the range of about 0.5 to 15 percent by weight, preferably about 1 to 8 percent by weight. The preferred solids level is such as to yield a final dry coating thickness within the range of about $2.54 \times 10^{-7}$ to $2.54 \times 10^{-5}$ cm, which translates into a solids level on a weight basis of from 0.00305 g/m$^2$ to 0.305 g/m$^2$. The preferred thickness range of the dried acrylic coating is from about $2.54 \times 10^{-7}$ to $7.62 \times 10^{-6}$ cm, with an optimum thickness of about $6.25 \times 10^{-7}$ cm.

III. The Nodule Surface

It has been found that specific coating compositions which come within the above description—relatively high methyl methacrylate content terpolymers in combination with specific surfactants at relatively low concentrations—form a "nodule" surface upon oriented polyester film when the coating composition is coated upon oriented or non-oriented polyester film, and heat set. Such a "nodule" surface exhibits a reduced coefficient of friction in comparison to acrylic coated polyester films which do not exhibit the nodule surface, and may possess significant commercial advantages over coated polyester films which rely upon the addition of discrete particles to reduce their coefficient of friction.

"Nodule surface" may be defined as nodule islands rising from the surface of said film with a minimum surface area coverage of about 5 percent. If the surface of the polyester film is coated too thickly, no individual nodule islands will exist. Instead, each nodule contacts other nodules such that they coalesce and no individual islands exist, thus forming a ridged pattern of acrylic terpolymer coating. A coverage of less than about 5 percent of the surface area of the film does not significantly reduce the coefficient of friction compared with non-coated polyester film. Thus, the desired range of coating to achieve the nodule surface is between 5 percent of the surface area of the polyester film and the point where the surface area is so completely covered that the nodules coalesce and few, if any, individual islands exist.

In a preferred embodiment the acrylic coating composition comprises 94.8 percent by weight (based on the total weight of the composition) of methyl methacrylate terpolymer, 5.0 percent by weight nonionic surfactant, and 0.2 percent by weight anionic surfactant, where the terpolymer comprises 80 mole percent methyl methacrylate, 15 mole percent ethyl acrylate, and 5 mole percent N-methylol acrylamide. This preferred coating composition when applied at a 1 percent by weight solids level produces a nodule surface, when dry, as illustrated in the photomicrograph, whereby the nodules cover a minimum of about 9.8 percent of the surface, and a maximum of 13.9 percent of the surface with an average of about 11 percent of the surface of the polyester film. The average diameter of a circle with the same area as the surface nodules, known as the Waddel diameter, is a common method of measuring nodules. In the preferred coating composition, the minimum Waddel diameter in micrometers was 0.071, the maximum was 0.520, and the average was 0.196. Lastly, the longest dimension of the nodules of the preferred coating composition, in micrometers was 0.09 as the minimum, 1.27 as a maximum, and 0.279 as the average. In this preferred embodiment, the coating polymer is also present as a thin film in the areas between nodules.

Colloidal silica may be incorporated into the aqueous emulsion of the terpolymer at a concentration of from about 5 percent to about 50 percent by weight of the aqueous emulsion. When the colloidal silica is employed, the preferred concentration is about 10 percent by weight of the acrylic terpolymer emulsion with the colloidal silica having an average particle size of 20 millimicrons (mu).

In the examples below, biaxially oriented polyethylene terephthalate film having acrylic coatings were evaluated for various properties such as slip (coefficient of friction), haze, and textured surface. Coefficient of friction (COF) was determined in accordance with ASTM Method D 1894-68 and all film samples were conditioned in accordance with ASTM Method D-618, Procedure A.

The dimensionless units of coefficient of friction are interpreted to indicate good slip (or handleability) if the COF ranges between 0.3 to 0.7. Below 0.2, slip is too great. That is, the films are difficult to wind and are considered unsatisfactory. Above 0.7 slip is inadequate. Film having a COF in excess of 0.7 is prone to "blocking". When a film blocks, it frequently does not slip over the surface to which it is in contact. Haze, the best indication of the clarity of the film, is determined according to ASTM Test Method D 1003-61 procedure A Section 7.

Whether the acrylic surface of the film sample possessed a "nodule surface" was determined by visual inspection via scanning electron microscope for nodule islands and to determine surface area of the nodules. The film surface was characterized by SEM (scanning electron microscopy) examination. The "nodule" surface coverage was determined by digital image analysis of the SEM surface images. Both the SEM and digital image analysis system are commercially available systems. The SEM is a Cambridge Stereoscan 200 with a LaB (lanthanum hexaboride) source, digital image storage capability, and a secondary electron detector. This SEM is interfaced to a Kevex 8000 Microanalysis system equipped with Kevex's AIA (Automated Image Analysis) digital imaging software for image processing and feature analysis.

EXAMPLE 1

Polyethylene terephthalate film was corona treated and subsequently in-line coated between the first and second stretching operations with a 4 percent solids aqueous dispersion of a methyl methacrylate coating composition having crosslinked and uncrosslinked formulations. The nominal "wet" lay down was 0.5 pounds/1000 square feet of forward drawn sheet. The biaxially oriented polyester film's nominal thickness (uncoated) was 300 gauge.

The formulations and experimental results of the coated films are set forth in Table 1. The following abbreviations have the following meanings:

MMA: Methyl methacrylate
EA: Ethyl acrylate
MAM: Methacrylamide
AM: Acrylamide
N-MA: N-methylol methacrylamide A coefficient of friction between 0.2 and 0.7 is good. Below 0.2 means the coated film is too slippery, while above 0.7 means that the film will not slide sufficiently against its comparative surface. The terminology A/A means the coefficient of friction between a top surface and a like top surface, while A/B means the coefficient of friction between a top surface and a bottom (the other side) surface of the film. For critical haze applications, any number less than 1.0 is acceptable. If haze is not a factor, any number is acceptable.

formaldehyde or melamine-formaldehyde to crosslink the coating polymer. Therefore, the first coating composition employed 4 percent by weight of Cymel 303, a melamine-formaldehyde resin commercially available from American Cyanamid Company.

Contrarily, the second coating composition contained 5 mole percent acrylamide with no second reactional resin. Accordingly, Example 1 shows that it is not mandatory that a second reactional resin be employed when non-self-crosslinking monomers such as acrylamide or methacrylamide are employed.

EXAMPLE 2

Following the general practice and procedure of Example 1, polyethylene terephthalate film was corona treated and subsequently in-line coated between the first and second stretching operations with a 4 percent solids aqueous dispersion of the crosslinkable methyl methacrylic coating composition. The nominal wet lay down was 0.5# (wet)/1000 square feet of forward drawn sheet. The biaxially oriented polyester film's nominal thickness (uncoated) was 83 gauge.

The coating formulations and experimental results of the coated films are set forth in Table II.

TABLE II

| Coating Formulation | Coating Thickness (microinches) | Coefficient of Friction Static | Coefficient of Friction Kinetic | Total Haze | Percent Transmission | Nodule Surface | Amount of Surfactants |
|---|---|---|---|---|---|---|---|
| 4% by weight (60 mole % MMA/35 mole % EA/5 mole % N-MA) | 1.13 | A/A .50<br>A/B .51 | .54<br>.50 | .15 | 90.0 | No | 0.2 weight % sodium lauryl sulfate<br>5.0 weight % octylphenol ethoxylate |
| 4% by weight (75 mole % MMA/20 mole % EA/5 mole % N-MA) | 1.01 | A/A .48<br>A/B .43 | .51<br>.45 | 3.35 | 90.4 | Yes | 0.2 weight % sodium lauryl sulfate<br>5.0 weight % octylphenol ethoxylate |
| 4% by weight (75 mole % MMA/20 mole % EA/5 mole % MAM) | .95 | A/A .47<br>A/B .47 | .52<br>.47 | 1.44 | 90.0 | Yes | 0.2 weight % sodium lauryl sulfate<br>5.0 weight % octylphenol ethoxylate |
| 3.84% by weight (75 mole % MMA/20 mole % EA + 5 mole % MAM) + 0.16% by weight Cymel 303 | .99 | A/A .49<br>A/B .47 | .52<br>.47 | 2.71 | 90.3 | Yes | 0.2 weight % sodium lauryl sulfate<br>5.0 weight % octylphenol ethoxylate |

Various mole percents of methyl methacrylate were employed with both self-crosslinkers such as N-methylol acrylamide and with other monomers such as methacrylamide, both with and without a second reactional resin such as melamine-formaldehyde.

It is theorized that the first composition didn't produce a nodule surface because too much nonionic sur-

TABLE 1

| Coating Formulation | Coating Thickness (microinches) | Coefficient of Friction Static | Coefficient of Friction Kinetic | Total Haze | Percent Transmission | Nodule Surface | Amount of Surfactants |
|---|---|---|---|---|---|---|---|
| 96% by weight terpolymer (65 mole % MMA/30 mole % EA/5 mole % MAM) + 4% by weight Cymel 303 | .97 | A/A .38<br>A/B .37 | .34<br>.35 | 1.37 | 89.6 | Yes | 0.2% by weight sodium lauryl sulfate<br>5.0% by weight octylphenol ethoxylate |
| (65 mole % MMA/30 mole % EA/5 mole % AM) | .98 | A/A .41<br>A/B .38 | .43<br>.41 | .79 | 89.4 | Yes | 0.2% by weight sodium lauryl sulfate<br>5.0% by weight octylphenol ethoxylate |

Both the coating formulations in Table 1 produced a nodule surface. The first coating composition contained, among other components, 5 mole percent methylacrylamide. As explained previously, when acrylamide or methacrylamide are employed, it may be necessary to employ a second reactional resin such as ureafactant was employed. The remaining 3 compositions contained 75 mole percent methylmethacrylate in the terpolymer and produced a nodule surface when emulsified with: A) a self-crosslinking monomer (N-methylol acrylamide); B) a monomer (methacrylamide); and C) a monomer with a second reactional resin (methacrylamide and melamine-formaldehyde (Cymel 303)).

The coating formulations and experimental results of the crosslinked coated film are set forth in Table III.

TABLE III

| (Mole %) Emulsion Composition | | | Sodium Lauryl Sulfate (Wt. %) | Octyl-phenol Ethox. (Wt. %) | Coating Formulation | Emulsion Synthesis Runnability | Coefficient of Friction | | | (%) Total Haze | % Transmission | Nodule Formation (As Observed Via Sem at 3000×) |
|---|---|---|---|---|---|---|---|---|---|---|---|---|
| MMA | EA | N-MA | | | | | | Static | Kinetic | | | |
| 75 | 20 | 5 | .2 | 5 | 4% Solids | Filtered poorly | A/A<br>A/B | .5<br>.58 | .58<br>.50 | 1.71 | 89.7 | Yes |
| 60 | 35 | 5 | .2 | 2 | 4% Solids | Good | A/A<br>A/B | .64<br>.74 | .68<br>.53 | .45 | 89.7 | No |
| 85 | 10 | 5 | .2 | 10 | 4% Solids | Good | A/A<br>A/B | .46<br>.46 | .54<br>.41 | 1.26 | 89.5 | Yes |
| 75 | 20 | 5 | .2 | 5 | 4% Solids | Filtered poorly | A/A<br>A/B | .48<br>.78 | .56<br>.61 | 1.61 | 89.6 | Yes |
| 85 | 10 | 5 | .2 | 2 | 4% Solids | Emulsion gelled | A/A<br>A/B | —<br>— | —<br>— | — | — | — |
| 60 | 35 | 5 | .2 | 10 | 4% Solids | Filtered poorly | A/A<br>A/B | BK<br>BK | BK<br>BK | .25 | 89.3 | No |
| 80 | 15 | 5 | .2 | 5 | 4% Solids | Excellent | A/A<br>A/B | .41<br>.39 | .45<br>.36 | 2.05 | 89.6 | Yes |
| 75 | 20 | 5 | .2 | 7.5 | 4% Solids | Excellent | A/A<br>A/B | .60<br>.79 | .66<br>.58 | .94 | 89.4 | Yes |
| 75 | 20 | 5 | .2 | 5 | 1% Solids | Filtered poorly | A/A<br>A/B | .51<br>.60 | .54<br>.49 | .34 | 88.9 | Yes |
| 75 | 20 | 5 | .2 | 7.5 | 1% Solids | Excellent | A/A<br>A/B | .53<br>.80 | .58<br>.62 | .27 | 89.9 | Yes |
| 80 | 15 | 5 | .2 | 5 | 1% Solids | Excellent | A/A<br>A/B | .41<br>.43 | .42<br>.41 | .34 | 89.9 | Yes |
| 60 | 35 | 5 | .2 | 10 | 1% Solids | Filtered poorly | A/A<br>A/B | .9<br>BK | .81<br>.66 | .26 | 88.8 | No |
| 85 | 10 | 5 | .2 | 2 | 1% Solids | Emulsion gelled | A/A<br>A/B | —<br>— | —<br>— | — | — | — |
| 75 | 20 | 5 | .2 | 5 | 1% Solids | Filtered poorly | A/A<br>A/B | .48<br>.62 | .50<br>.52 | .41 | 88.9 | Yes |
| 85 | 10 | 5 | .2 | 10 | 1% Solids | Good | A/A<br>A/B | .51<br>.56 | .50<br>.46 | .24 | 88.9 | Yes |
| 60 | 35 | 5 | .2 | 2 | 1% Solids | Good | A/A<br>A/B | .57<br>.72 | .57<br>.57 | .21 | 88.9 | Yes |
| 75 | 20 | 5 | .2 | 5 | .9% Solids + .1% Colloidal Silica | Filtered poorly | A/A<br>A/B | .56<br>.51 | .55<br>.49 | .32 | 89.0 | Yes |
| 85 | 10 | 5 | .2 | 10 | .9% Solids + .1% Colloidal Silica | Good | A/A<br>A/B | .50<br>.47 | .38<br>.42 | .26 | 88.9 | Yes |
| 75 | 20 | 5 | .2 | 5 | .9% Solids + .1% Colloidal Silica | Filtered poorly | A/A<br>A/B | .48<br>.44 | .47<br>.42 | .40 | 88.9 | Yes |
| 60 | 35 | 5 | .2 | 10 | .9% Solids + .1% Colloidal Silica | Filtered poorly | A/A<br>A/B | .54<br>.52 | .47<br>.49 | .22 | 88.8 | Yes |
| 85 | 10 | 5 | .2 | 2 | .9% Solids + .1% Colloidal Silica | Emulsion gelled | A/A<br>A/B | —<br>— | —<br>— | — | — | — |
| 75 | 20 | 5 | .2 | 7.5 | .9% Solids + .1% Colloidal Silica | Excellent | A/A<br>A/B | .51<br>.47 | .48<br>.47 | .28 | 88.9 | Yes |
| 80 | 15 | 5 | .2 | 5 | .9% Solids + .1% Colloidal Silica | Excellent | A/A<br>A/B | .46<br>.41 | .43<br>.40 | .38 | 88.9 | Yes |

Note:
BK = Blocked, did not slip

EXAMPLE 3

In view of Example 2, it was decided to widely vary the methyl methacrylate composition, vary the surfactant levels, and vary the amount of coating formulation (1 percent solids vs. 4 percent solids) to determine the various effects such changes make upon the nodule formation. The procedure set forth in Example 1 with respect to coating the film was repeated. The nominal "wet" lay down was 0.5 pounds (wet) per 1,000 square feet of forward drawn film. The biaxially oriented polyester film's nominal thickness (uncoated) was 83 gauge.

The results of Table III tend to indicate several things, namely:

1) 1 percent solids in the coating formulation tends to result in a coated polyester film which has less haze, which is desirable in certain applications such as glazing;
2) with more methyl methacrylate it is generally necessary to employ more nonionic surfactant in order to produce a stable emulsion;
3) replacing some of the solids content of the coating formulation with colloidal silica is possible and desirable when methyl methacrylate is less than about 70 mole percent of the emulsion composition;

4) lower mole percents of methyl methacrylate means a softer terpolymer and thus the addition of colloidal silica appears to improve the coefficient of friction, while a higher mole percent of methyl methacrylate results in a harder terpolymer and the addition of colloidal silica does not appear to influence the coefficient of friction in an significant manner.

EXAMPLE 4

Both uniaxial and biaxial films were employed and for in-line (during manufacturing of the film) and off-line (after manufacture of film) operations. The acrylic terpolymer emulsion (solids) comprised 80 mole percent MMA, 15 mole percent EA, and 5 mole percent N-MA, using 0.2 percent by weight sodium lauryl sulfate and 5.0 percent by weight octylphenol ethoxylate. The coating was applied by the reverse gravure process with a nominal wet lay down of 0.5 pounds per 1,000 square feet of forward drawn film. Experiment 2 was a repetition of the last experiment in Table III. Experiment 3 off-line coated side B of the Experiment 2 film with 0.3 percent solids. This level of solids was chosen because it was approximately the amount of coating on the Experiment 2 film after it was stretch oriented (stretch orienting was done at about 3.3 to 1). Experiment 4 is similar to Experiment 3, except 1 percent solids was coated off-line onto the film. Experiments 5–7 relate to uniaxial film. This film was unoriented prior to coating (in-line) and uniaxially oriented and heat set. Experiment 6 differed from Experiment 7 only in the use of colloidal silica. The results are set forth in Table IV.

That which is claimed is:

1. An oriented polyester film having a nodule surface for producing a low coefficient of friction surface comprising:

an oriented polyester film having an acrylic coating composition on at least one surface, said acrylic coating being a dried residue of an aqueous emulsion comprising:
(a) from 80 to 97.9 percent by weight, based upon the total weight of said composition, of a methyl methacrylate terpolymer comprising:
   (1) from 60 to 90 mole percent of methyl methacrylate;
   (2) from 10 to 35 mole percent of at least one modifier selected from the group consisting of ethyl acrylate, propyl acrylate, butyl acrylate, and a mixture of these;
   (3) from 1 to 10 mole percent of at least one comonomer selected from the group consisting of N-methylol acrylamide, N-methylol methacrylamide, acrylamide, methacrylamide, and a mixture of these;
(b) from 2 to 15 percent by weight, based upon the total weight of said coating composition, of a nonionic surfactant;
(c) at least from about 0.1 percent by weight, based upon the total weight of said coating composition, of an anionic surfactant;
wherein said acrylic coating forms a nodule surface characterized by nodule islands rising from the surface of said film with a minimum surface area coverage of about 5 percent.

2. The coated film of claim 1, wherein said nonionic surfactant is an alkylphenol ethoxylate.

3. The coated film of claim 2, wherein said alkylphenol ethoxylate is octylphenol ethoxylate with a nominal degree of polymerization of 40.

4. The coated film of claim 1, wherein said nonionic surfactant is selected from the group consisting of so-

TABLE IV

| Experiment | Film Thickness (Gauge) | Orientation | Amount Formulation | Location of Coating | Nodules? | Coefficient of Friction | | Total Haze Percent | Transmission Percent |
|---|---|---|---|---|---|---|---|---|---|
| | | | | | | Static | Kinetic | | |
| 1 | 92 | Biaxial | Uncoated | None | No | A/A BK | BK | .22 | 90.7 |
| | | | | | | B/B BK | BK | | |
| | | | | | | A/B BK | BK | | |
| 2 | 92 | Biaxial | .9% Solids + .1% Colloidal Silica | Air Side-In Line (Side A) | Yes | A/A .46 | .43 | .87 | 91.0 |
| | | | | | | B/B BK | BK | | |
| | | | | | | A/B .46 | .46 | | |
| 3 | 92 | Biaxial | .3% Solids | Drum Side-Off Line (Side B) | Yes | A/A — | — | 1.06 | 91.1 |
| | | | | | | B/B BK | .64 | | |
| | | | | | | A/B .6 | .55 | | |
| 4 | 92 | Biaxial | 1% Solids | Drum Side-off Line (Side B) | Yes | A/A .53 | .54 | 1.69 | 91.6 |
| | | | | | | B/B .66 | .70 | | |
| | | | | | | A/B .7 | .64 | | |
| 5 | 350 | Uniaxial | Uncoated | None | No | A/A — | — | 1.40 | 90.9 |
| | | | | | | B/B BK | .68 | | |
| | | | | | | A/B BK | .64 | | |
| 6 | 350 | Uniaxial | 1% Solids | Drum Side-In Line (Side B) | Yes | A/A — | — | 1.80 | 90.9 |
| | | | | | | B/B .38 | .44 | | |
| | | | | | | A/B .38 | .42 | | |
| 7 | 350 | Uniaxial | .9% Solids + .1% Colloidal Silica | Drum Side-In Line (Side B) | Yes | A/A — | — | 1.69 | 91.0 |
| | | | | | | B/B .46 | .49 | | |
| | | | | | | A/B .52 | .56 | | |

BK = Blocked

As Experiment 3 and 4 demonstrate, off-line coating doesn't appear to be as effective as in-line coating. Experiments 6 and 7 demonstrate that uniaxial film can be employed in the present invention.

Thus, it is apparent that there has been provided, in accordance with the invention, a coated film and a process for producing a coated film that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternative, modifications, and variations as fall within the spirit and scope of the present invention.

dium lauryl sulfate and sodium dodecylbenzene sulfonate.

5. The coated film of claim 1, wherein said nonionic surfactant is from about 2 to about 10 percent by weight, based on the total weight of said coating composition.

6. The coated film of claim 5, wherein said anionic surfactant is in a range from about 0.1 to about 0.5 percent by weight, based upon the total weight of said coating composition.

7. The coated film of claim 1, wherein said coating further comprises colloidal silica.

8. The coated film of claim 1, wherein said comonomer is self-crosslinking, and wherein said modifier is ethyl acrylate, and wherein said non-ionic surfactant is octylphenol ethoxylate, and wherein said anionic surfactant is sodium lauryl sulfate.

* * * * *